US012781481B2

(12) United States Patent
Zhao

(10) Patent No.: US 12,781,481 B2
(45) Date of Patent: Nov. 3, 2026

(54) CONNECTING STRUCTURE OF H-SHAPED WATER CHANNEL BODY

(71) Applicant: STARLAND (XIAMEN) INDUSTRY AND TRADE CO., LTD., Fujian (CN)

(72) Inventor: Lichun Zhao, Fujian (CN)

(73) Assignee: STARLAND (XIAMEN) INDUSTRY AND TRADE CO., LTD., Fujian (CN)

( * ) Notice: Subject to any disclaimer, the term of this patent is extended or adjusted under 35 U.S.C. 154(b) by 160 days.

(21) Appl. No.: 18/870,693

(22) PCT Filed: Mar. 16, 2023

(86) PCT No.: PCT/CN2023/081913
§ 371 (c)(1),
(2) Date: Aug. 12, 2025

(87) PCT Pub. No.: WO2024/168968
PCT Pub. Date: Aug. 22, 2024

(65) Prior Publication Data

US 2025/0369210 A1 Dec. 4, 2025

(30) Foreign Application Priority Data

Feb. 15, 2023 (CN) ......................... 202320229078.5

(51) Int. Cl.
*E03C 1/04* (2006.01)
*E03C 1/02* (2006.01)
(Continued)

(52) U.S. Cl.
CPC ............ *E03C 1/0403* (2013.01); *F16K 27/10* (2013.01); *F16L 13/02* (2013.01);
(Continued)

(58) Field of Classification Search
CPC ............. E03C 1/0403; E03C 2001/026; E03C 2001/028; F16K 11/22; F16K 27/00;
(Continued)

(56) References Cited

U.S. PATENT DOCUMENTS 2,732,229 A * 1/1956 Gaum ..................... F16L 13/02 285/288.11
7,748,406 B2 * 7/2010 Pilatowicz ................ E03C 1/08 239/443
(Continued)

*Primary Examiner* — Kenneth Rinehart
*Assistant Examiner* — Jonathan J Waddy
(74) *Attorney, Agent, or Firm* — Birchwood IP

(57) ABSTRACT

A connecting structure of an H-shaped water channel body, including a central body (1) and two valve seats (2). The central body (1) is separately connected to the two valve seats (2) by means of a hot plate connecting structure. The hot plate connecting structure includes a first connecting part (3) and a second connecting part (4) which are respectively
(Continued)

arranged on the valve seat (2) and the central body (1). The first connecting part (3) and the second connecting part (4) are hot-plate welded, and an inner flash cavity (S1) and an outer flash cavity (S2) are respectively formed on the inner and outer sides of the hot-plate welded position between the first connecting part (3) and the second connecting part (4). The connecting structure has the advantages of low production costs and less flash.

7 Claims, 6 Drawing Sheets

(51) Int. Cl.
*F16K 11/22* (2006.01)
*F16K 27/10* (2006.01)
*F16L 13/02* (2006.01)

(52) U.S. Cl.
CPC ......... *E03C 2001/026* (2013.01); *F16K 11/22* (2013.01); *Y10T 137/87579* (2015.04)

(58) Field of Classification Search
CPC .......... F16K 41/02; F16K 47/02; F16K 27/10; F16K 27/102; F16L 13/02; F16L 13/0245; F16L 23/18; F16L 23/20; F16L 23/22; F16L 41/02; F16L 47/02; Y10T 137/87579; Y10T 137/9464
USPC ...................................... 4/695; 137/603, 801
See application file for complete search history.

(56) References Cited

U.S. PATENT DOCUMENTS

2009/0085350 A1* 4/2009 Muzzo .................. F16L 23/032 285/336
2011/0209793 A1* 9/2011 Ko ........................ E03C 1/0403 138/140
2012/0067436 A1* 3/2012 Jacoway ................... F16L 5/00 137/15.18
2012/0067978 A1* 3/2012 Leichty ................. E03C 1/0403 239/417.5
2014/0345724 A1* 11/2014 Cai ..................... F16K 27/0263 137/603
2015/0354183 A1* 12/2015 Mao ...................... F16K 19/006 137/15.18
2017/0159852 A1* 6/2017 Chen ....................... B29C 65/02
2019/0145084 A1* 5/2019 Li ........................... F16K 27/00 137/625.4
2019/0178424 A1* 6/2019 Sidgman Saitua ..... F16L 13/02
2020/0011457 A1* 1/2020 You ....................... B29C 66/612

* cited by examiner

CONNECTING STRUCTURE OF H-SHAPED WATER CHANNEL BODY

TECHNICAL FIELD

The present invention relates to the field of kitchens and bathrooms, and in particular, to a connecting structure of an H-shaped water channel body.

BACKGROUND OF THE INVENTION

An H-shaped water channel body is generally provided in an existing double-handle temperature control faucet. A horizontal pipe in the middle of the water channel body is provided with a water outlet led outwards, and two ends of the horizontal pipe are separately connected to a valve seat for mounting a water regulating valve.

Early H-shaped water channel bodies were obtained by casting blanks from copper and then machining the blanks in a complex manner. The water channel bodies made of copper were expensive due to the shortage of copper resources, high machining cost, and low yield. For this reason, attempts have been made to produce the H-shaped water channel body of the double-handle temperature control faucet by replacing copper with plastic and using an injection molding process suitable for mass production instead of complex machining. However, due to the particularity and complexity of the structure of the H-shaped water channel body, an inner hole of the horizontal pipe on the water channel body cannot be formed by a conventional injection molding process. Therefore, the existing plastic H-shaped water channel body is generally produced by manufacturing two valve seats and a central body by sectional injection molding and then joining the two valve seats and the central body.

Currently, the valve seats and the central body of the plastic H-shaped water channel body are generally connected by using laser welding or ultrasonic welding. The laser welding process has high requirements, resulting in high production costs of the plastic H-shaped water channel body. The ultrasonic welding generates excess glue at the connecting part of the valve seats with the central body, which may overflow outwards to influence the appearance of the H-shaped water channel body. Sonic welding generates excess glue at the connecting part of the valve seats with the central body, which may overflow inwards to the water path to influence the water path connectivity of the H-shaped water channel body. Therefore, manufacturers producing the H-shaped water channel body expect a connecting structure of the H-shaped water channel body with low production costs and less flash.

BRIEF SUMMARY OF THE INVENTION

It is an object of the present invention to provide a connecting structure of an H-shaped water channel body, which has advantages of low production costs and less flash.

To attain the above object, the present invention provides the following technical solutions:

A connecting structure of an H-shaped water channel body, comprising a central body and two valve seats; two ends of the central body are separately connected to the two valve seats each by means of a hot plate connecting structure; each of the hot plate connecting structures comprises a first connecting part arranged on one of the valve seat and the central body, and a second connecting part arranged on another one of the valve seat and the central body; the first connecting part and the second connecting part are both of a hollow structure; the first connecting part is provided with a plug-in tube and a welding ring surrounding the plug-in tube; the second connecting part is provided with a plug-in port, a welding pipe surrounding the plug-in port, and a shielding ring surrounding the welding pipe; when the first connecting part is connected to the second connecting part, the plug-in tube of the first connecting part is plugged into the plug-in port of the second connecting part, the welding ring of the first connecting part is hot plate welded with the welding pipe of the second connecting part, an inner flash cavity is formed between the welding ring and the welding pipe and the plug-in tube, the shielding ring of the second connecting part abuts against the first connecting part, and an outer flash cavity is formed between the shielding ring and the welding ring and the welding pipe.

The first connecting part is provided with a stopper flange; when the first connecting part is connected to the second connecting part, the shielding ring of the second connecting part abuts against the stopper flange.

The plug-in tube of the first connecting part and the plug-in port of the second connecting part are both square in shape.

The valve seat is integrally formed with a water inlet pipe; an outer wall of the water inlet pipe is integrally formed with external threads.

The valve seat is integrally formed with a water inlet pipe; the water inlet pipe is adhesive bonded with a copper pipe having external threads.

The valve seat is integrally formed with a mounting groove.

An upper water outlet and a lower water outlet are integrally formed in a middle part of the central body.

According to the above technical solutions, two ends of the central body are separately connected to the two valve seats each by means of a hot plate connecting structure; the first connecting part and the second connected part of the hot plate connecting structure are connected by hot plate welding, which results in lower costs than laser welding, such that the production costs can be effectively reduced by the present invention. The inner flash cavity and the outer flash cavity are formed when the first connecting part and the second connecting part are connected, such that excess plastic flash generated in hot plate welding of the welding ring of the first connecting part with the welding pipe of the second connecting part can be collected by the inner flash cavity and the outer flash cavity, thereby avoiding the excess plastic flash from overflowing outwards and overflowing inwards to the water path. As a result of the reduction in plastic flash, the appearance of the H-shaped water channel body would not be affected by excess plastic flash overflowing outwards, and water path connectivity of the H-shaped water channel body would not be affected by excess plastic flash overflowing to the water path, thereby effectively improving the appearance and the water path connectivity of the H-shaped water channel body

Figure 1:
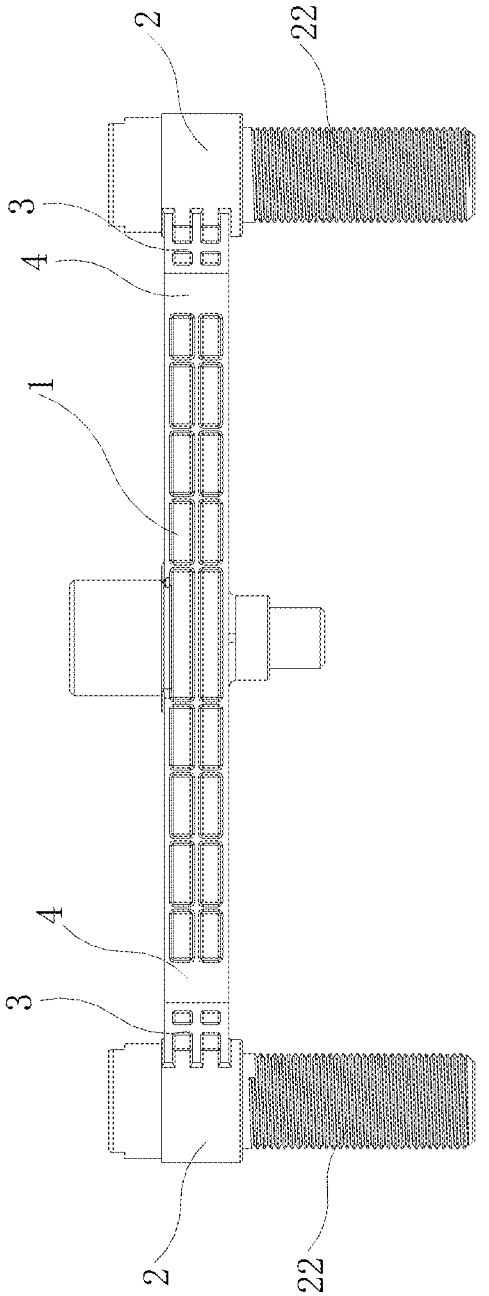
FIG. 1 is a schematic structural view of Embodiment I of the present invention.

REFERENCE NUMERALS IN THE FIGURES a central body 1, an upper water outlet 11, a lower water outlet 12,
a valve seat 2, a mounting groove 21, a water inlet pipe 22,
a first connecting part 3, a plug-in tube 31, a welding ring 32,
a second connecting part 4, a plug-in port 41, a welding pipe 42, a shielding ring 43,
a copper pipe 5, a hot plate connecting structure L.
an inner flash cavity S1, and an outer flash cavity S2.

DETAILED DESCRIPTION OF THE INVENTION

To further explain the technical solutions of the present invention, a detailed description of the present invention is provided hereinafter through specific embodiments.

As shown in FIGS. 1 to 6, the present invention discloses a connecting structure of an H-shaped water channel body, which comprises a central body 1 and two valve seats 2. Two ends of the central body 1 are separately connected to the two valve seats 2 each by means of a hot plate connecting structure L. The hot plate connecting structure L comprises a first connecting part 3 arranged on the valve seat 2 and a second connecting part 4 arranged on the central body 2. The first connecting part 3 and the second connecting part 4 are both of a hollow structure. The first connecting part 3 is provided with a plug-in tube 31 and a welding ring 32 surrounding the plug-in tube 31, and the second connecting part 4 is provided with a plug-in port 41. a welding pipe 42 surrounding the plug-in port 41, and a shielding ring 43 surrounding the welding pipe 42. When the first connecting part 3 is connected to the second connecting part 4, the plug-in tube 31 of the first connecting part 3 is plugged into the plug-in port 41 of the second connecting part 4, the welding ring 32 of the first connecting part 3 is hot plate welded with the welding pipe 42 of the second connecting part 4, an inner flash cavity S1 is formed between the welding ring 32 and the welding pipe 42 and the plug-in tube 31, the shielding ring 43 of the second connecting part 4 abuts against the first connecting part 3, and an outer flash cavity S2 is formed between the shielding ring 4 and the welding ring 32 and the welding pipe 42.

In the present invention, the first connecting part 3 and the second connecting part 4 are connected by hot plate welding, which results in lower costs than laser welding, such that the production costs can be effectively reduced by the present invention. The inner flash cavity S1 and the outer flash cavity S2 are formed when the first connecting part 3 and the second connecting part 4 are connected, such that excess plastic flash generated in hot plate welding of the welding ring 32 of the first connecting part 3 with the welding pipe 42 of the second connecting part 4 can be collected by the inner flash cavity S1 and the outer flash cavity S2, thereby avoiding the excess plastic flash from overflowing outwards and overflowing inwards to the water path. As a result of the reduction in plastic flash, the appearance of the H-shaped water channel body would not be affected by excess plastic flash overflowing outwards, and water path connectivity of the H-shaped water channel body would not be affected by excess plastic flash overflowing to the water path, thereby effectively improving the appearance and the water path connectivity of the H-shaped water channel body. In addition, it should be noted that the present invention is not limited to the first connecting part 3 of the hot plate connecting structure L being arranged on the valve seat 2 and the second connecting part 4 of the hot plate connecting structure L being arranged on the central body 1; as an alternative, the first connecting part 3 of the hot plate connecting structure L may be arranged on the central body 1 and the second connecting part 4 of the hot plate connecting structure L may be arranged on the valve seat 2, and this can also achieve the above effects.

Figure 2:
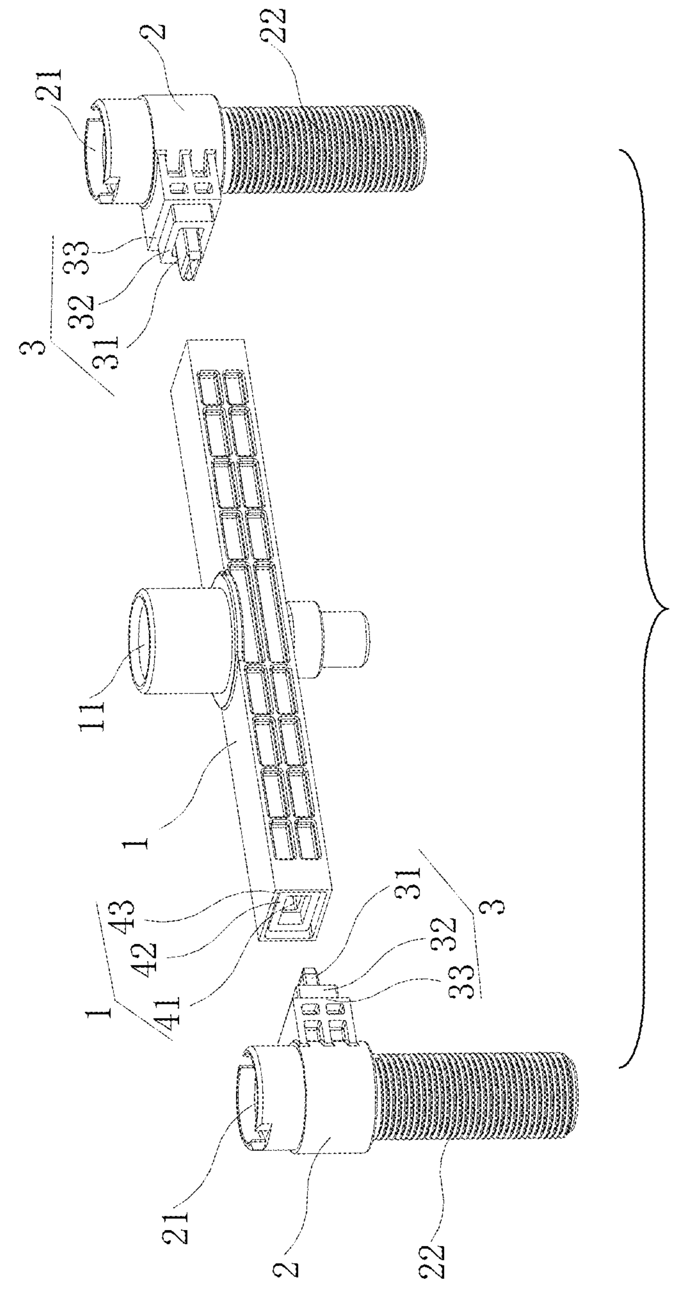
FIG. 2 is an exploded view of the structure of Embodiment I of the present invention.
Figure 5:
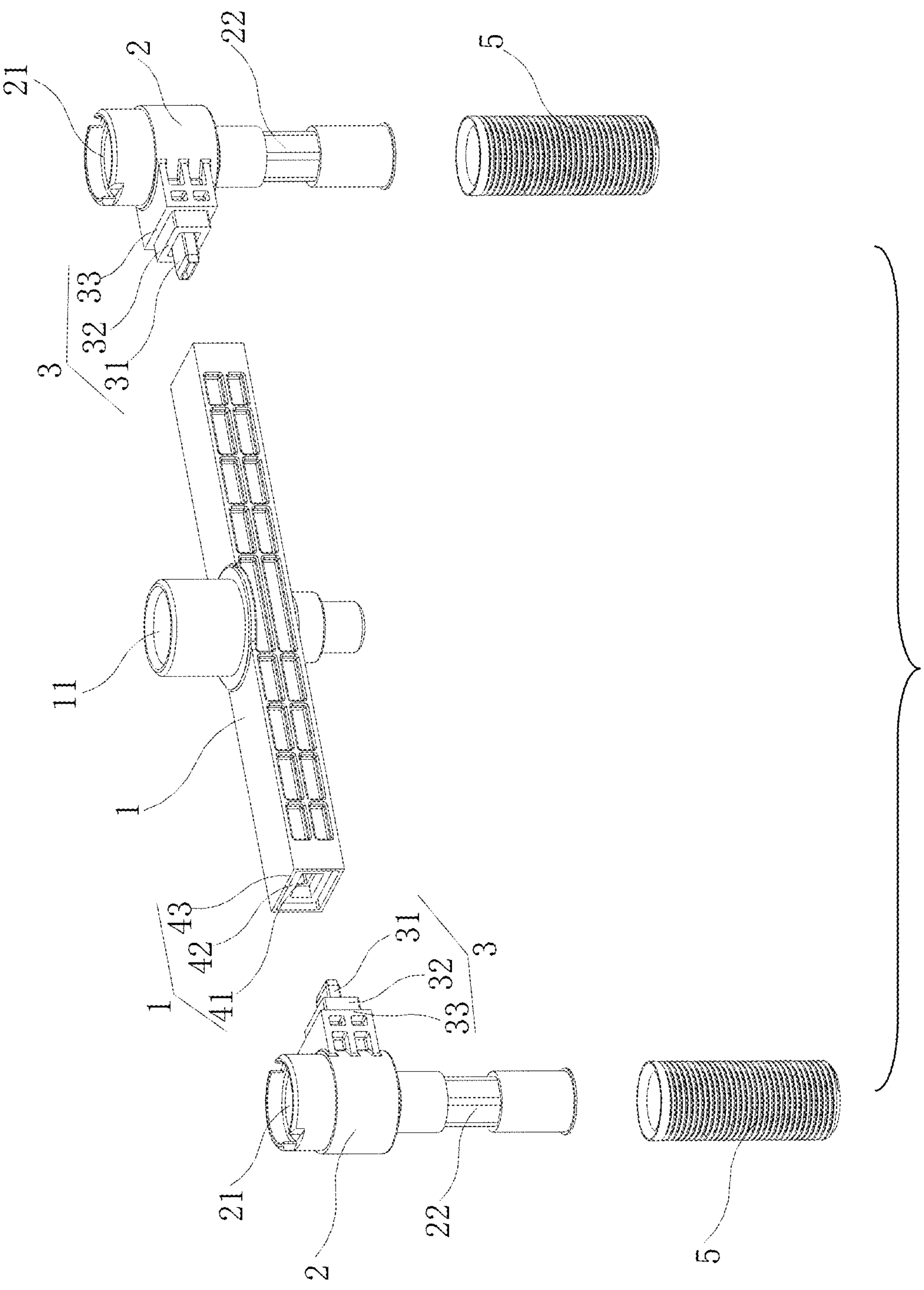
FIG. 5 is an exploded view of the structure of Embodiment II of the present invention.

With reference to FIGS. 2 and 5, in the embodiments of the present invention, the plug-in tube 31 of the first connecting part 3 and the plug-in port 41 of the second connecting part 4 are both square in shape, such that the plug-in tube 31 can be accurately plugged into the plug-in port 41 to accurately connect the central body 1 with the valve seat 2. The first connecting part 3 can be provided with a stopper flange 33, and when the first connecting part 3 is connected to the second connecting part 4, the shielding ring 43 of the second connecting part 4 abuts against the stopper flange 33, and the stopper flange 33 can coordinate with the shielding ring 43 to limit the plug-in position of the plug-in tube 31 and limit the welding position of the welding ring 32 and the welding pipe 42, thereby facilitating improvement of the connection accuracy and stability of the first connecting part 3 and the second connecting part 4. It should be noted that the plug-in tube 31 of the first connecting part 3 and the plug-in port 41 of the second connecting part 4 are not limited to being both square in shape, but may have oval or other special-shaped structures, as long as the plug-in tube 31 can be accurately plugged into the plug-in port 41 to accurately connect the central body 1 with the valve seat 2.

Figure 3:
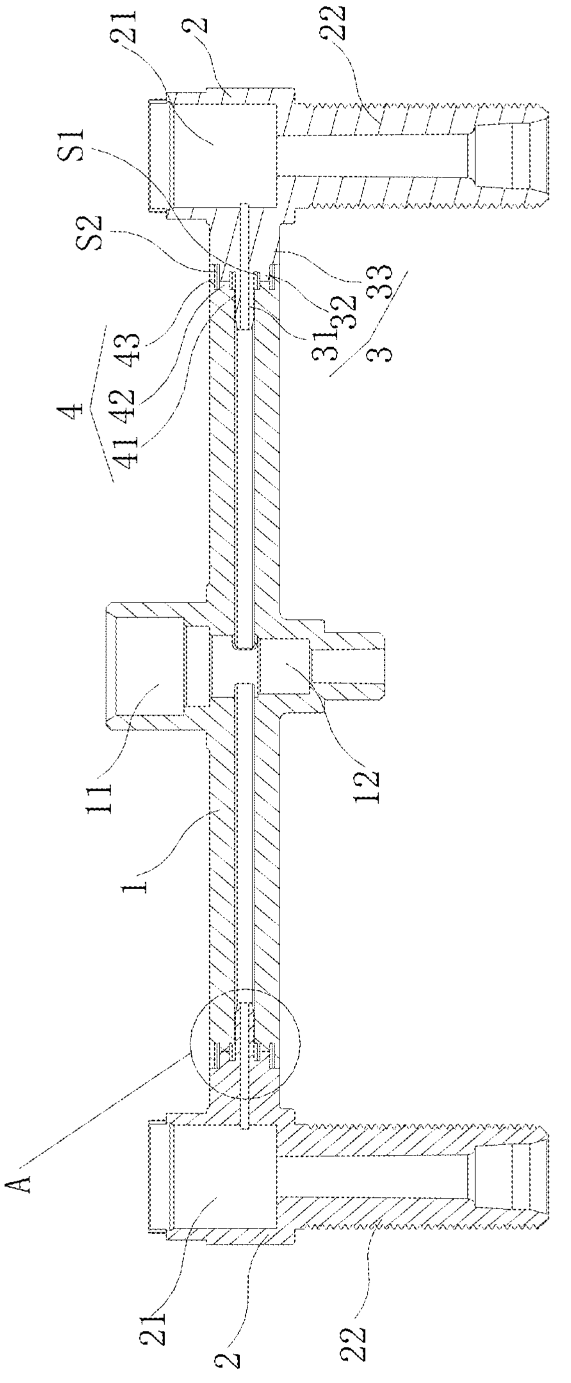
FIG. 3 is a sectional view of Embodiment I of the present invention.
Figure 4:
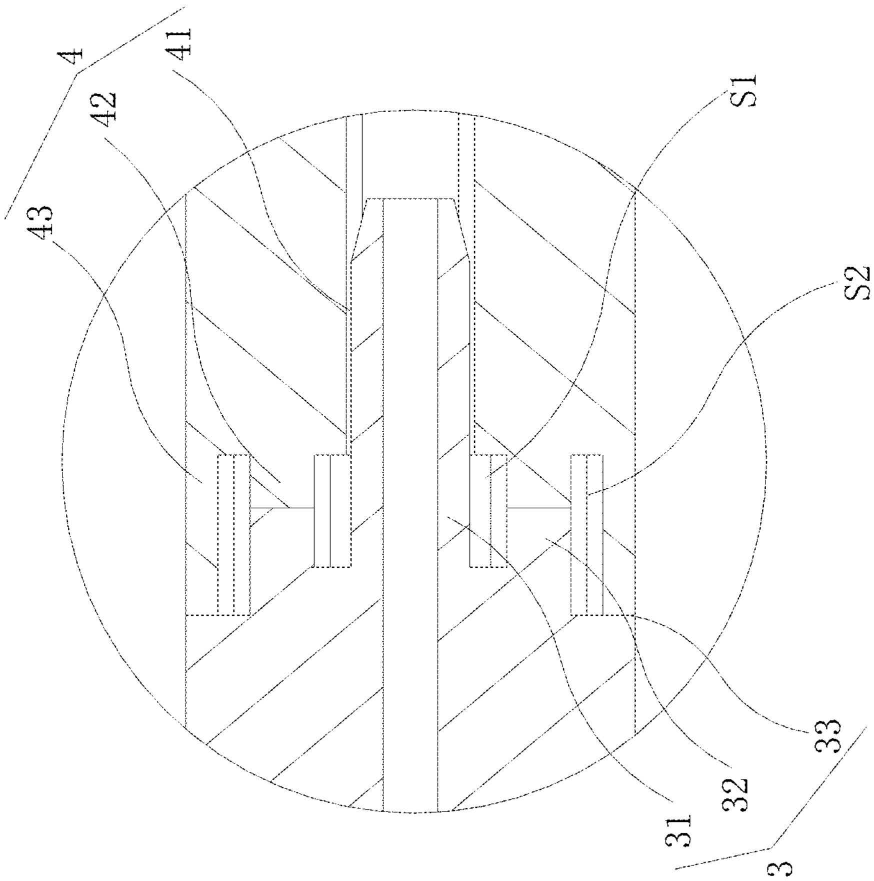
FIG. 4 is an enlarged view of portion A in FIG. 3.
Figure 6:
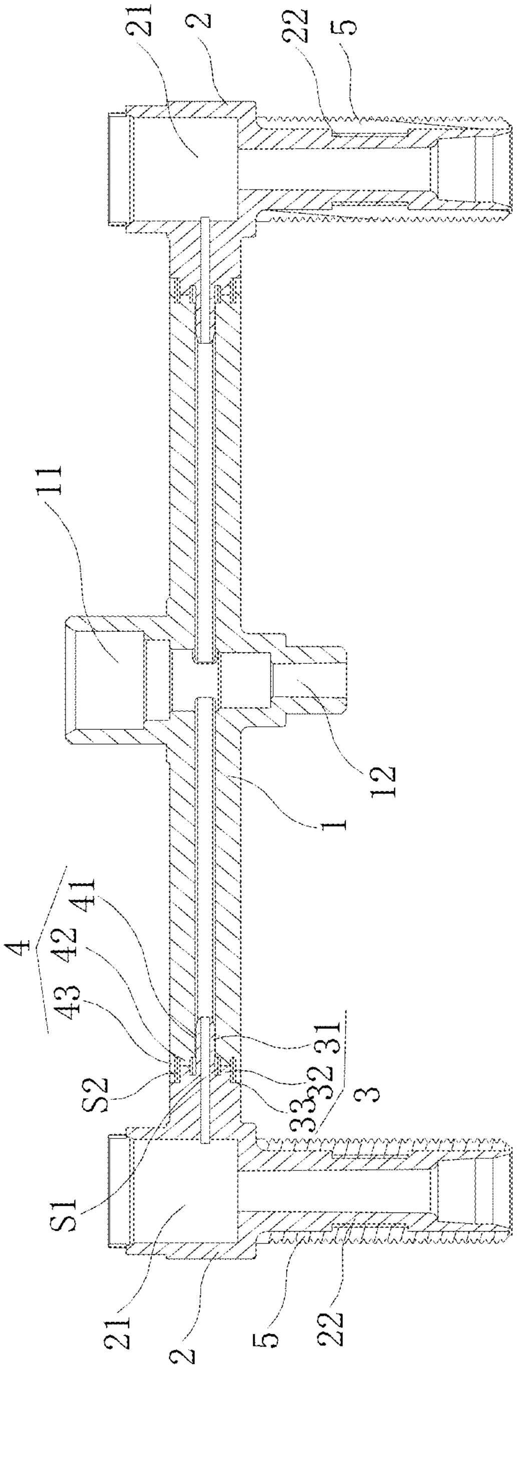
FIG. 6 is a sectional view of Embodiment II of the present invention.

With reference to FIGS. 3 and 6, in the embodiments of the present invention, an upper water outlet 11 and a lower water outlet 12 are integrally formed in a middle part of the central body 1, and the upper water outlet 11 and the lower water outlet 12 are used for connection with different water outlet pipelines.

With reference to FIGS. 3 and 6, in the embodiments of the present invention, the valve seat 2 is integrally formed with a mounting groove 21, and the mounting groove 21 is used for mounting a water regulating valve.

With reference to FIGS. 1 to 3, in Embodiment I of the present invention, the valve seat 2 is integrally formed with a water inlet pipe 22, an outer wall of the water inlet pipe 2 is integrally formed with external threads, and the external threads of the water inlet pipe 2 are used for connection with a water inlet pipeline.

With reference to FIGS. 5 and 6, in Embodiment II of the present invention, the valve seat 2 is integrally formed with a water inlet pipe 22, the water inlet pipe 22 is adhesive bonded with a copper pipe 5 having external threads; the copper pipe 5 is also used for connection with a water inlet pipeline, and the strength of the copper pipe 5 is better than that of plastic, such that the connection between the copper pipe 5 and the water inlet pipeline is more stable.

The above embodiments and illustrations are not intended to limit the form and style of the product of the present invention. Any appropriate variations or modifications made by those of ordinary skill in the art shall be considered as falling within the scope of patent of the present invention.

What is claimed is:

1. A connecting structure of an H-shaped water channel body, comprising a central body and two valve seats; two ends of the central body are respectively connected to the two valve seats each by means of a hot plate connecting structure;

each of the hot plate connecting structures comprises a first connecting part arranged on one of the valve seat and the central body, and a second connecting part arranged on another one of the valve seat and the central body;

the first connecting part and the second connecting part are both of a hollow structure;

the first connecting part is provided with a plug-in tube and a welding ring surrounding the plug-in tube; the second connecting part is provided with a plug-in port, a welding pipe surrounding the plug-in port, and a shielding ring surrounding the welding pipe;

when the first connecting part is connected to the second connecting part, the plug-in tube of the first connecting part is plugged into the plug-in port of the second connecting part, the welding ring of the first connecting part is hot plate welded with the welding pipe of the second connecting part, an inner flash cavity is formed between the welding ring and the welding pipe and the plug-in tube, the shielding ring of the second connecting part abuts against the first connecting part, and an outer flash cavity is formed between the shielding ring and the welding ring and the welding pipe.

2. The connecting structure of an H-shaped water channel body as in claim 1, wherein the first connecting part is provided with a stopper flange;

when the first connecting part is connected to the second connecting part, the shielding ring of the second connecting part abuts against the stopper flange.

3. The connecting structure of an H-shaped water channel body as in claim 1, wherein the plug-in tube of the first connecting part and the plug-in port of the second connecting part are both square in shape.

4. The connecting structure of an H-shaped water channel body as in claim 1, wherein each valve seat is integrally formed with a water inlet pipe; an outer wall of each water inlet pipe is integrally formed with external threads.

5. The connecting structure of an H-shaped water channel body as in claim 1, wherein each valve seat is integrally formed with a water inlet pipe; each water inlet pipe is adhesive bonded with a copper pipe having external threads.

6. The connecting structure of an H-shaped water channel body as in claim 1, wherein each valve seat is integrally formed with a mounting groove.

7. The connecting structure of an H-shaped water channel body as in claim 1, wherein an upper water outlet and a lower water outlet are integrally formed in a middle part of the central body.

* * * * *